United States Patent
Ganhotra et al.

(10) Patent No.: US 11,954,138 B2
(45) Date of Patent: Apr. 9, 2024

(54) SUMMARY GENERATION GUIDED BY PRE-DEFINED QUERIES

(71) Applicant: INTERNATIONAL BUSINESS MACHINES CORPORATION, Armonk, NY (US)

(72) Inventors: Jatin Ganhotra, Jersey City, NJ (US); Sachindra Joshi, Gurgaon (IN); Chulaka Gunasekara, New Hyde Park, NY (US); Guy Feigenblat, Givataym (IL); Benjamin Sznajder, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/661,761

(22) Filed: May 3, 2022

(65) Prior Publication Data
US 2023/0359657 A1    Nov. 9, 2023

(51) Int. Cl.
G06F 16/00 (2019.01)
G06F 16/332 (2019.01)
G06F 16/34 (2019.01)
G06F 16/35 (2019.01)

(52) U.S. Cl.
CPC ........ *G06F 16/345* (2019.01); *G06F 16/3329* (2019.01); *G06F 16/358* (2019.01)

(58) Field of Classification Search
CPC ... G06F 16/345; G06F 16/358; G06F 16/3329
USPC .......................................................... 707/739
See application file for complete search history.

(56) References Cited

U.S. PATENT DOCUMENTS

| | | | |
|---|---|---|---|
| 10,824,658 B2 * | 11/2020 | Bakis | G06F 40/35 |
| 10,878,197 B2 * | 12/2020 | Yin | G06F 40/35 |
| 10,915,588 B2 * | 2/2021 | Bakis | G06N 5/022 |
| 11,087,094 B2 | 8/2021 | Chatterjee | |
| 11,095,579 B1 | 8/2021 | De Mazancourt | |
| 11,558,440 B1 * | 1/2023 | Tadesse | G11B 27/10 |
| 2009/0012926 A1 * | 1/2009 | Ishikawa | G06F 16/3325 |
| | | | 706/47 |
| 2015/0193429 A1 * | 7/2015 | Bohra | G06F 16/3329 |
| | | | 704/9 |
| 2020/0175114 A1 * | 6/2020 | Dechu | G06F 16/367 |
| 2020/0327432 A1 | 10/2020 | Doebelin | |

OTHER PUBLICATIONS

Sandeep Subramanian et al., "On Extractive and Abstractive Neural Document Summarization with Transformer Language Models"; arXiv:1909.03186v2 [cs.CL]; Apr. 28, 2020; 9 pages.*

Asai, et al., "Evidentiality-guided Generation for Knowledge-Intensive NLP Tasks", Dec. 16, 2021, 17 pgs., <https://doi.org/10.48550/arXiv.2112.08688>.

(Continued)

*Primary Examiner* — Monica M Pyo
(74) *Attorney, Agent, or Firm* — Daniel J Blabolil

(57) ABSTRACT

A processor may transcribe an electronic representation of a dialogue. The processor may identify one or more question-answer pairs from the electronic representation. The processor may generate based upon the one or more identified question-answer pairs a summary of the dialogue. The processor may display the summary of the dialogue to a user.

14 Claims, 6 Drawing Sheets

(56) References Cited

OTHER PUBLICATIONS

Boni, et al., "HowSumm: A Multi-Document Summarization Dataset Derived from WikiHow Articles", Oct. 8, 2020, 10 pgs., arXiv:2110.03179v2 [cs.CL].

Chao, et al., "Learning Question-Guided Video Representation for Multi-Turn Video Question Answering", Jul. 31, 2019, 11 pgs., arXiv: 1907.13280v1 [cs.CL].

Disclosed Anonymously, "A Method and System for Identifying and Publishing Useful Answers to Popular Questions in Conversations Across Communication Channels", An IP.com Prior Art Database Technical Disclosure, IP. com No. IPCOM000265479D, Apr. 14, 2021, 5 pgs.

Disclosed Anonymously, "Method to Reduce the Number of Questions Asked Due to Conversation Handoffs Between Agents", An IP.com Prior Art Database Technical Disclosure, IP.com No. PCOM000265556D, Apr. 23, 2021, 5 pgs.

Disclosed Anonymously, Unified Short-Tail and Long-Tail Question Answer in a Multi-Turn Dialogflow via Knowledge Graph, An IP.com Prior Art Database Technical Disclosure, IP.com No. IPCOM000265957D, May 28, 2021, 4 pgs.

Feigenblat, et al., "TWEETSUMM—A Dialog Summarization Dataset for Customer Service", Nov. 23, 2021, 16 pgs., arXiv:2111.11894 [cs.CL].

Gunasekara, et al., "Summary Grounded Conversation Data Generation", Jun. 7, 2021, 9 pgs., arXiv:2106.03337v1 [cs.CL].

Gunasekara, et al., "Using Question Answering Rewards to Improve Abstractive Summarization", Findings of the Association for Computational Linguistics: EMNLP 2021, 9 pgs., Nov. 7-11, 2021, ©2021 Association for Computational Linguistics.

Guo, et al, "Dialog-to-Action: Conversational Question Answering Over a Large-Scale Knowledge Base", 32nd Conference on Neural Information Processing Systems (NeurIPS 2018), Montréal, Canada, Dec. 2018, 10 pgs.

Mell et al., "The NIST Definition of Cloud Computing", National Institute of Standards and Technology, Special Publication 800-145, Sep. 2011, 7 pages.

Roitman, et al., "Unsupervised Dual-Cascade Learning with Pseudo-Feedback Distillation for Query-based Extractive Summarization", Nov. 1, 2018, 16 pgs., arXiv:1811.00436 [cs.CL].

\* cited by examiner

120

Dialogue 122

Line 1: User: Hi, I need to get a payment extension.

Line 2: Agent: Hello ~name~, thanks for your message. Let me get this payment extension sorted for you. Are you referring to mobile ending in ~num~?

Line 3: User: Yes

Line 4: Agent: No worries, I will help you. Before we proceed, I'm going to send you a ONE TIME PIN, then SEND the pin if you received it. Thank you very much.

Line 5: User: ONE TIME PIN: ******

Line 6: Agent: Thank you. May I ask when is your most convenient time to settle the payment balance?

Line 7: User: I can pay it Wednesday the 20th of November.

Line 8: Agent: All set here. I have successfully locked in the extension until November 20th. Here is your reference number INT ~num~- Does this solve your enquiry?

Line 9: User: It does, thank you.

Line 10: Agent: Thank you and have a great day!

Question-Answer Pairs 124

1. What is the user's request/problem? ⟷ 1. User needs to get a payment extension. (Line 1)

2. Was the user authenticated? ⟷ 2. Agent sends a ONE TIME PIN and asks user to send the pin back after receiving. (Line 4)

3. What was the solution proposed? ⟷ 3. Ask which day to settle payment. (Line 6)

4. Was the solution accepted? ⟷ 4. User can pay it Wednesday the 20th of November. (Line 7 or 8)

5. What are the confirmation details for the solution/transaction? ⟷ 5. Provide user the reference number. (Line 8)

FIG. 1B

SUMMARY GENERATION GUIDED BY PRE-DEFINED QUERIES

BACKGROUND

The present disclosure relates generally to the field of natural language processing, and more specifically to summary generation of dialogue guided by pre-defined queries.

Traditionally, generating summaries for conversations/dialogues either use an extractive approach or an abstractive approach for generation. The extractive approach identifies key phrases/utterances as-is from dialogue and aims for recall/completeness in the summary as provided by the dialogue. The abstractive approach generates a natural language summary given the dialogue and aims for coherence/readability of the summary.

SUMMARY

Embodiments of the present disclosure include a method, computer program product, and system for summary generation of dialogue guided by pre-defined queries. A processor may transcribe an electronic representation of a dialogue. The processor may identify one or more question-answer pairs from the electronic representation. The processor may generate based upon the one or more identified question-answer pairs a summary of the dialogue. The processor may display the summary of the dialogue to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 1B illustrates a block diagram of an example question-answer pair identification, in accordance with aspects of the present disclosure.

Figure 1A:
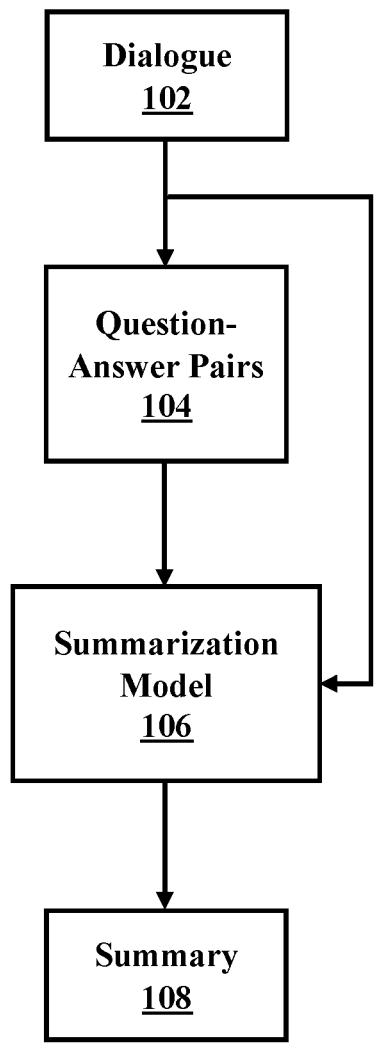
FIG. 1A illustrates a block diagram of an example system for summary generation of dialogue guided by pre-defined queries, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of natural language processing, and more specifically to summary generation of dialogue guided by pre-defined queries. While the present disclosure is not necessarily limited to such applications, various aspects of the disclosure may be appreciated through a discussion of various examples using this context.

Traditionally, generating summaries for conversations/dialogues either use an extractive approach or an abstractive approach for generation. The extractive approach identifies key phrases/utterances as-is from dialogue and aims for recall/completeness in the summary as provided by the dialogue (e.g., aims from recall/completeness of the dialogue in the summary), but may lack coherence/readability of the summary. The abstractive approach, on the other hand, generates a natural language summary given the dialogue and aims for coherence/readability of the summary, but may lack recall/completeness.

Accordingly, detailed herein is a proposed solution (e.g., method, system, and computer program product) for creating question-answer (QA)-driven dialogue summaries that are guided by pre-defined set(s) of questions/queries. Such a solution combines extractive and abstractive approaches to provide higher recall and coherence of generated summaries. Further, the proposed solution address changes in dialogue(s) just by adding/replacing (new) questions as the dialogue changes/progresses.

Before turning to the FIGS., it may be beneficial to discuss one or more core aspects of the proposed solution. In some embodiments, the proposed solution may have an offline process and a runtime process for summary generation of dialogue guided by pre-defined queries.

In some embodiments, how questions and answers and/or QAs are identified may be determined/found in the offline process. For instance, questions may be curated by an offline subject matter expert (SME) who identifies the most common steps in a process (e.g., authentication, validation, ticket resolution, etc.) that need to be captured in a summary, such as, "was the user authenticated?" may be a requirement in certain Customer Care settings processes.

In some embodiments, answers may be identified by span-annotations provided by SMEs and/or automated agents (e.g., natural language processing [NLP] taggers, etc.). Further, answers may be identified based on rule-based extraction based on initial annotations and reviewed by SMEs. In such an embodiment, rule-based extraction can leverage similar conversations obtained from clustering (e.g., multiple conversations/dialogues involving the same type of product may have similar answers in regard to the type of product). In some embodiments, answers can be identified and/or refined by training span-selection models based on above annotated data.

In some embodiments, for the runtime process may include a question selector and/or an answer extractor/generator. In such an embodiment, the question selector may be a text classifier that identifies relevant questions for a given dialogue (e.g., multi-label classification). For example, the question selector could ask "what is the topic of the dialogue," "was authentication valid?," etc." It is noted the for the proposed solution, any text classifier can be trained to be the question selector, where input for the question selector is dialogue and output is/are class(es) (e.g., questions applicable for the provided dialogue).

For example, dialogue may consist of a user interacting with a chatbot and the user stating in a chat window that:

"Hi, my computing device, which is an XYZ device is not responding to voice commands." The chatbot may respond with "Oh no, I am sorry to hear that, it looks like your XYZ device needs an upgrade to OS 1.1111." The question selector would then analyze the full dialogue between the user and the chatbot and determine that valuable questions from the dialogue could be "what is the device being discussed," "what was the user problem," and "was there a given solution by the chatbot."

In some embodiments, the answer extractor/generator may provide extraction based on any span-selection model (e.g., Stanford Question Answering Dataset [SQuAD] setting). The answer extractor/generator may then generate answers based on a conditional text generation model, such as, BART, GPT-2, etc., that is trained to take both the dialogue and the identified question(s) as the input and generate the appropriate answer(s). In some embodiments, the input for the answer extractor/generator may be in the form of: <dialogue> <user> user turn 1<system> system turn 1<user> user turn 2 . . . <user> user turn n <question> question text <answer> answer text <end>.

It is noted that due to the online and offline processes of the proposed solution that the proposed solution is not dependent on a specific QA approach, that is, the proposed solution can use any QA approach for identifying a correct answer given a question. Further, the proposed solution focuses on "focal questions," which are key questions for capturing the highlights in a conversation for the summarization use-case in an agent/SME/chatbot assist scenario.

Accordingly, disclosed herein and throughout is the proposed solution, which generates a summary given a conversation/dialogue. The proposed solution identifies a set of focal questions by SME input and/or by identifying (from a database/historical dialogue repository) similar questions from past conversations/dialogues.

Further, the proposed solution identifies a set of focal questions relevant to the conversation/dialogue; extracts/generates answers given the focal questions identified; and generates a summary grounded in QA pairs for the given conversation/dialogue.

Referring now to FIG. 1A, illustrated is a block diagram of an example system 100 for summary generation of dialogue guided by pre-defined queries, in accordance with aspects of the present disclosure. As depicted, the system 100 includes a dialogue 102, question-answer pairs 104, a summarization model 106, and a summary 108.

In some embodiments, the dialogue 102 is recorded via opt-in consent from two or more users. In other embodiments, the dialogue 102 may be recorded from a chat window between two or more users and/or chatbots/agents.

In some embodiments, the dialogue 102 is ingested by NLP mechanisms (not depicted), which may tag parts of speech of the dialogue, annotate segments/section of the dialogue, etc. The ingested dialogue, as depicted, is provided both to the question-answer pairs 104, which designate question-answer pairs within the dialogue, and the summarization model 106, which provides both extractive and abstractive means for generating the summary 108. In some embodiments, the question-answer pairs 104 are simultaneously provided to the summarization model 106 along with the dialogue 102, as a whole.

In some embodiments, the summary 108 is generated by the summarization model 106 and displayed to a user (e.g., SME, agent, etc.). In some embodiments, the summary 108 may be provided back to the system 100 and used for training and/or refining the identification of question-answer pairs 104 and/or the summarization model 106. It is noted that the extractive and abstractive nature of the summarization model 106 as provided by the simultaneous nature of the dialogue 102 and question-answer pairs 104 being given to the summarization model 106 allows for a higher quality summary 108 in regard to cohesion/readability and recall/completeness (e.g., the summary contains the most important/focal areas of the dialogue). It is further noted that that traditional systems in regard to summarization only include a dialogue, summarization model, and summary; there is a distinct lack of question-answer pairs.

Referring now to FIG. 1B, illustrated is a block diagram of an example question-answer pair identification 120, in accordance with aspects of the present disclosure. As depicted, the example question-answer pair identification 120 has a dialogue 122 and question-answer pairs 124. In some embodiments, the dialogue 122 may be the same as, or substantially similar to, the dialogue 102 of FIG. 1A and/or the question-answer pairs 124 may be the same as, or substantially similar to, the question-answer pairs 104 of FIG. 1A.

As depicted, the dialogue 122 is a conversation between a user and an agent. In some embodiments, the dialogue 122 may be obtained by a recording system where the user and agent both opted into the recording of the conversation. In other embodiments, the dialogue 122 may be a chat window that is logs/records the interaction between the user and the agent. In such an embodiment, the agent may be an automated agent such as a chatbot or automated assistant.

In some embodiments, the dialogue 122 is analyzed by NLP systems/techniques, which may be implemented by the system 100 of FIG. 1A or various other means. The dialogue 122 is annotated and parsed to determine answers for the question-answer pairs 124; as depicted, the answers are displayed on the right-hand side of the question-answer pairs 124 window. In some embodiments, from the answers, the questions in the question-answer pairs 124 can be generated; the questions are displayed on the left-hand side of the question-answer pairs 124. It is noted that although depicted with the questions and answers on designated sides, they could be arranged in any order.

In such embodiments, questions are predefined, and new questions can be added by SMEs based on client use-cases. Given predefined set of questions, a system, such as the system 100 of FIG. 1A, can extract the answers for these questions per the dialogue 122 by rule-based methods for extraction, annotations by SMEs, and/or using span-selection models (e.g., Stanford Question Answering Dataset [SQuAD], etc.) based on datasets from the rule-based extraction methods and annotations by the SMEs.

In some embodiments, given the question-answer pairs 124, summarization models (e.g., extractive, abstractive etc.) can be trained on new inputs (e.g., the dialogue 122). In some embodiments, the question-answer pair identification 120 can then be used to generate a concise and coherent summary. For example, the question-answer pairs 124 could be used to generate a summary for a second user that indicates that the user from the dialogue 122: "Required a payment extension, was verified by the agent with a ONE TIME PIN, and that the payment date for the user is now Wednesday, November 20."

Figure 2:
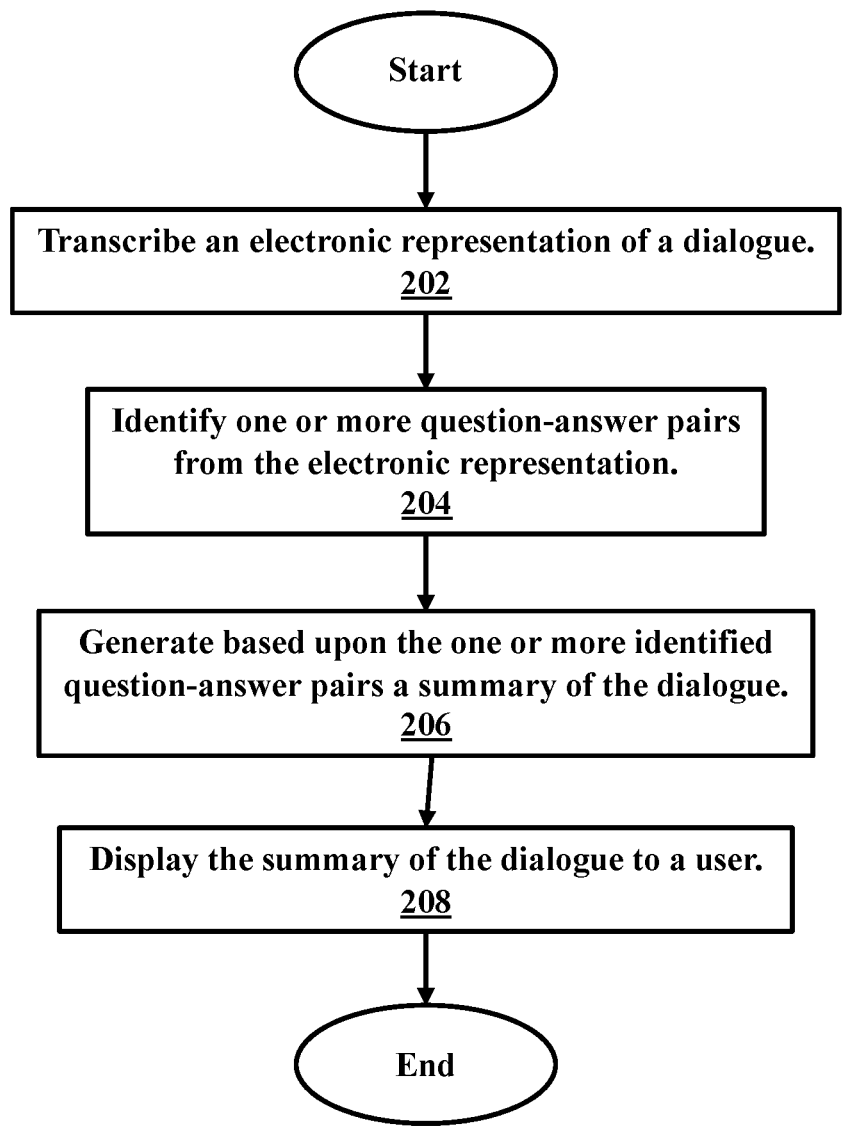
FIG. 2 illustrates a flowchart of an example method for summary generation of dialogue guided by pre-defined queries, in accordance with aspects of the present disclosure.

Referring now to FIG. 2, illustrated is a flowchart of an example method 200 for summary generation of dialogue guided by pre-defined queries, in accordance with aspects of the present disclosure. In some embodiments, the method 200 may be performed by a processor (e.g., of the system 100 of FIG. 1A, etc.).

In some embodiments, the method 200 begins at operation 202 where the processor transcribes an electronic representation of a dialogue. In some embodiments, the method 200 proceeds to operation 204, where the processor identifies one or more question-answer pairs from the electronic representation. In some embodiments, the method 200 proceeds to operation 206, where the processor generates, based upon the one or more identified question-answer pairs, a summary of the dialogue. In some embodiments, the method 200 proceeds to operation 208, where the processor displays the summary of the dialogue to a user. In some embodiments, after operation 208, the method 200 may end.

In some embodiments, discussed below, there are one or more operations of the method 200 not depicted for the sake of brevity and which are discussed throughout this disclosure. Accordingly, in some embodiments, transcribing the electronic representation of the dialogue may include the processor classifying one or more segments of the electronic representation of the dialogue with respective labels. The respective labels may indicate at least one segment of the electronic representation of the dialogue as a question and at least one other segment of the electronic representation of the dialogue as an answer. In some embodiments, an answer may be labeled, and a question/predefined question can be retrieved from an SME/machine learning database based on the labeled answer. For example, a conversation where a user indicates they need assistance with replacing a tire may have "tire replacement" labeled as an answer and the system analyzing the conversation may access a repository and find that "tire replacement" has associated questions, which are "what is the size of the tire," and "which vehicle needs tire replacement?" The questions allow the system to generate a summary for the user trying to replace the tire such that the tire can be replaced. Furthering the example, the summary may indicate that "35 inch tires that hold 40 psi or air are needed and then a lug nut key."

In some embodiments, identifying the one or more question-answer pairs from the electronic representation may include the processor parsing the electronic representation of the dialogue into one or more segments, analyzing each of the one or more segments, and grouping the one or more segments into the one or more question-answer pairs. In some embodiments, the processor may analyze each of the one or more segments for classifiers/labels and/or analyze each of the one or more segments in order to provide classifiers/labels to the segments (e.g., this is an answer, this segment has this part-of-speech, etc.).

In some embodiments, generating the summary of the dialogue may include the processor providing the question-answer pairs to a summarization model. The summarization model may ingest the question-answer pairs and the electronic representation as a whole (as depicted in FIG. 1A). In some embodiments, the processor may output the summary as a combined extractive and abstractive summary (e.g., the summary is both coherent [presented in layman prose] and provides completeness of the entire dialogue [no sections of the dialogue are frivolously left out]).

In some embodiments, the processor may receive feedback (e.g., from an automatically generated prompt, etc.) from the user. The feedback may indicate an understanding of the summary by the user (e.g., was the summary coherent?, did the summary include all discussed topics?, etc.). In some embodiments, the processor may update the summarization model with the feedback (which allows for more accurate summaries in regard to subsequent dialogues).

In some embodiments, the processor may identify one or more questions from the electronic representation. The processor may further generate one or more respective answers for each of the one or more questions. The one or more respective answers may be selected based on being associated with any of the one or more questions. In some embodiments, the generated one or more respective answers may be generated when there are not any corresponding answers within the dialogue. In some embodiments, the one or more respective answers being associated with any of the one or more questions may be determined based on a threshold similarity degree (e.g., payment date maybe be within a threshold similarity degree of due date and corresponding answers could be shown/generated for both payment date and due date, and/or etc.).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
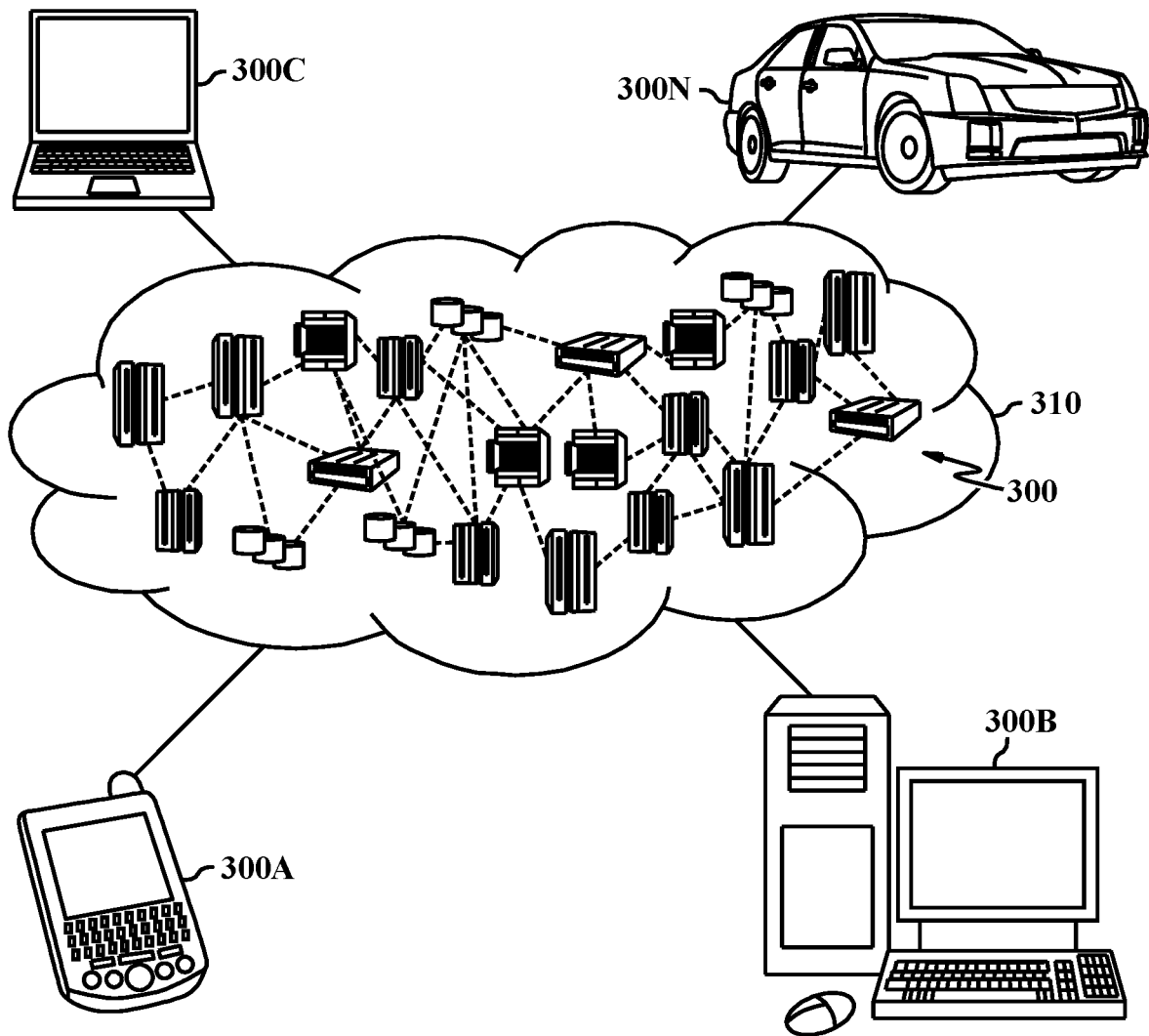
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
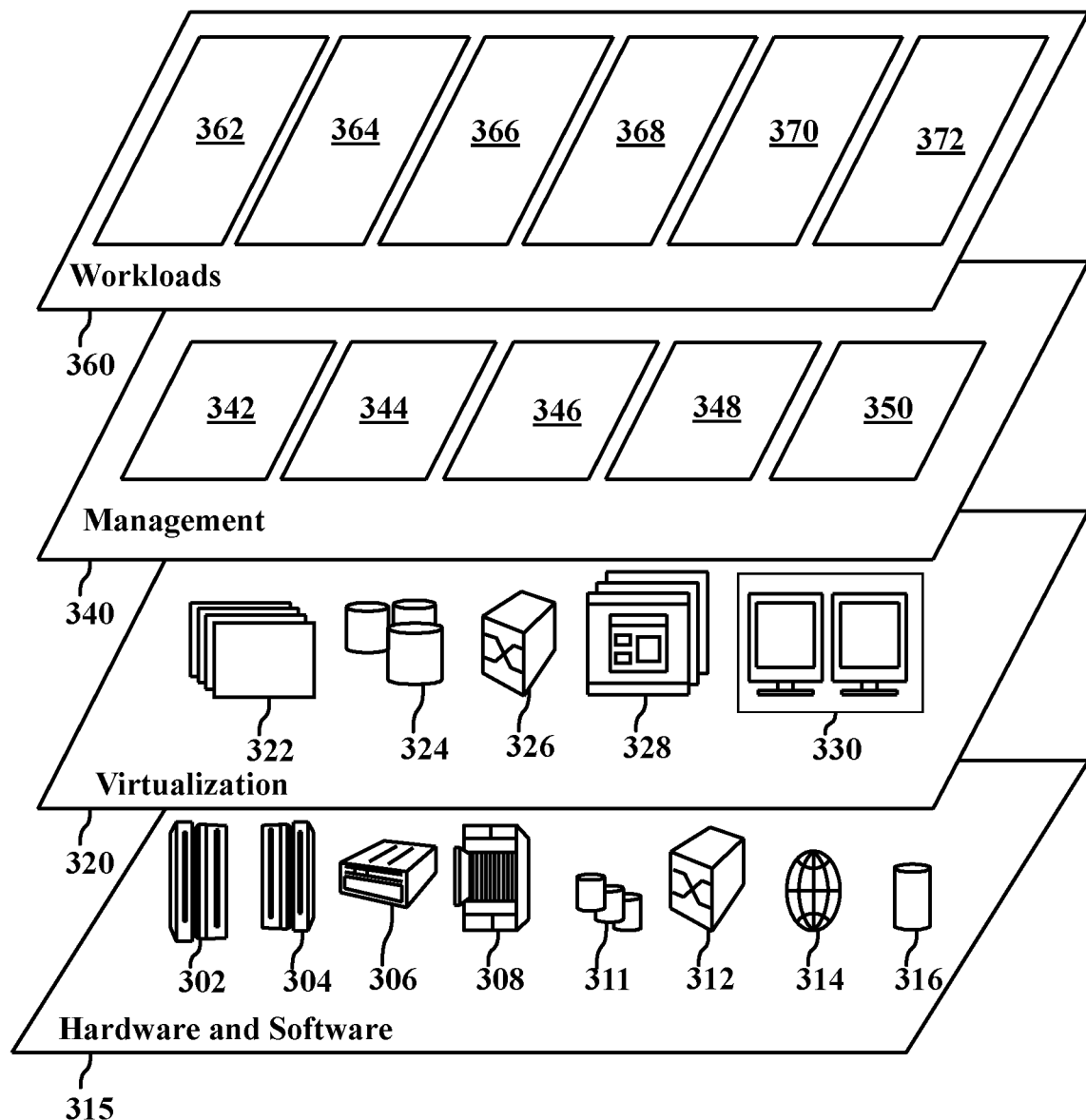
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and summary generation 372.

Figure 4:
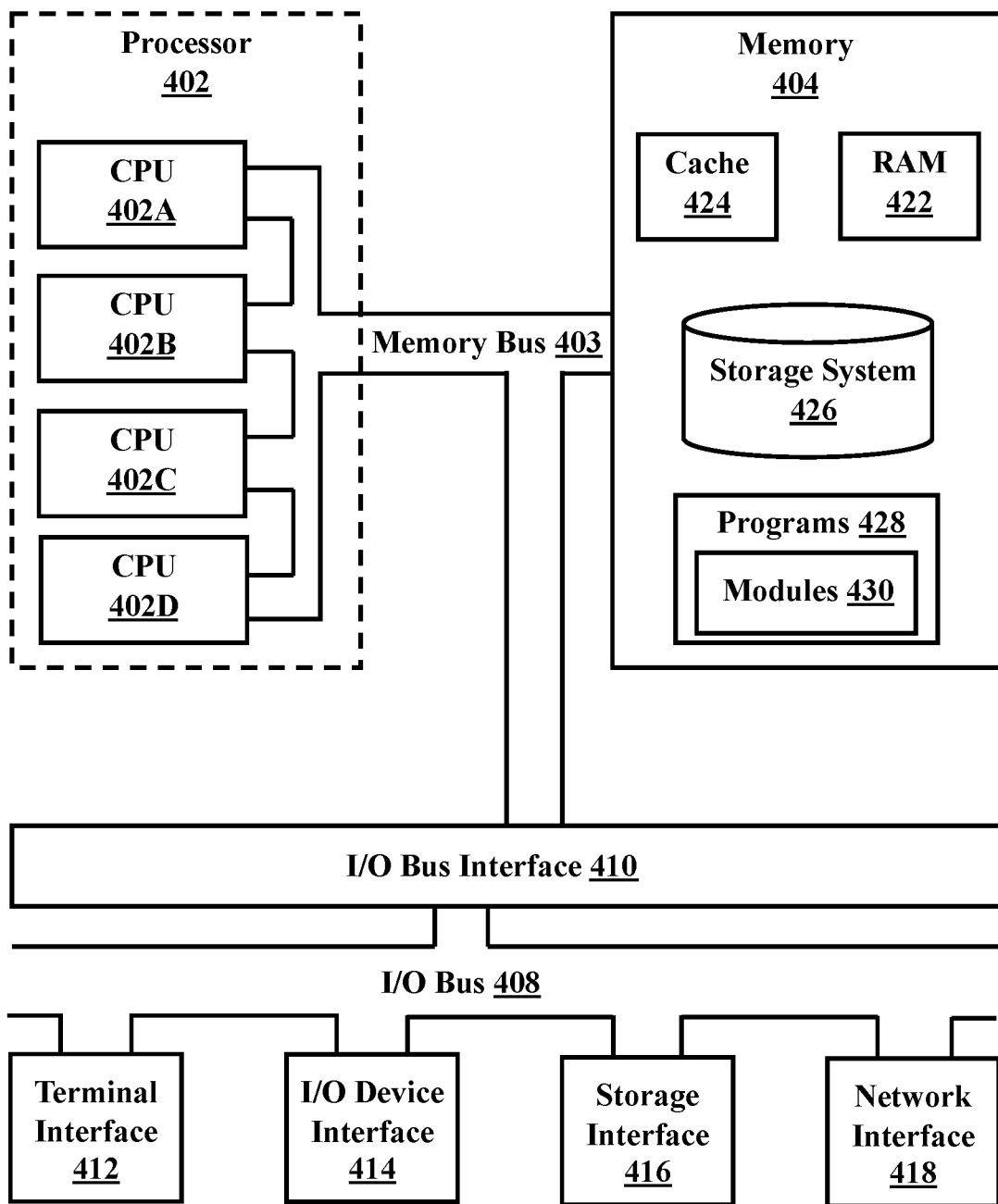
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for summary generation of dialogue guided by pre-defined queries, the system comprising:
   a memory; and
   a processor in communication with the memory, the processor being configured to perform operations comprising:
   transcribing an electronic representation of a dialogue from an ongoing human-to-human conversation;
   identifying one or more question-answer pairs from the electronic representation;
   providing the one or more question-answer pairs and the dialogue simultaneously to one or more trained summarization models;
   generating, concurrently, based upon the provided question-answer pairs and the dialogue, a summary of the dialogue, wherein the summary is a combined extractive summary that comprises layman prose and abstractive summary that comprises the entire dialogue, and one or more answers from the dialogue using the one or more trained summarization models when there are one or more questions without a corresponding answer in the dialogue, wherein the one or more trained summarization models ingest the question-answer pairs and the electronic representation as a whole, and wherein generating the summary includes:
   extracting completeness data, wherein the completeness data comprises important sentences, such as key phrases and/or utterances as-is from dialogue, from the extractive summary, and
   extracting coherency data, wherein the coherency data comprises a natural language summary given the dialogue, from the abstractive summary; and
   displaying the summary of the dialogue to a user.

2. The system of claim 1, wherein transcribing the electronic representation of the dialogue includes:
   classifying one or more segments of the electronic representation of the dialogue with respective labels, wherein the respective labels indicate at least one segment of the electronic representation of the dialogue as an answer.

3. The system of claim 1, wherein identifying the one or more question-answer pairs from the electronic representation includes:
- parsing the electronic representation of the dialogue into one or more segments;
- analyzing each of the one or more segments; and
- grouping the one or more segments into the one or more question-answer pairs.

4. The system of claim 1, wherein the processor is further configured to perform operations comprising:
- receiving feedback from the user, wherein the feedback indicates an understanding of the summary by the user; and
- updating the one or more summarization models with the feedback.

5. The system of claim 1, wherein the processor is further configured to perform operations comprising:
- identifying one or more questions from the electronic representation; and
- generating one or more respective answers for each of the one or more questions, wherein the one or more respective answers are selected based on being associated with any of the one or more questions.

6. A computer-implemented method for summary generation of dialogue guided by pre-defined queries, the system comprising:
- transcribing an electronic representation of a dialogue from an ongoing human-to-human conversation;
- identifying one or more question-answer pairs from the electronic representation;
- providing the one or more question-answer pairs and the dialogue simultaneously to one or more trained summarization models:
- generating, concurrently, based upon the provided question-answer pairs and the dialogue, wherein the summary is a combined extractive summary that comprises layman prose and abstractive summary that comprises the entire dialogue, and one or more answers from the dialogue using the one or more trained summarization models when there are one or more questions without a corresponding answer in the dialogue, wherein the one or more trained summarization models ingest the question-answer pairs and the electronic representation as a whole, and wherein generating the summary includes:
- extracting completeness data, wherein the completeness data comprises important sentences, such as key phrases and/or utterances as-is from dialogue, from the extractive summary, and
- extracting coherency data, wherein the coherency data comprises a natural language summary given the dialogue, from the abstractive summary; and
- displaying the summary of the dialogue to a user.

7. The computer-implemented method of claim 6, wherein transcribing the electronic representation of the dialogue includes:
- classifying one or more segments of the electronic representation of the dialogue with respective labels, wherein the respective labels indicate at least one segment of the electronic representation of the dialogue as an answer.

8. The computer-implemented method of claim 6, wherein identifying the one or more question-answer pairs from the electronic representation includes:
- parsing the electronic representation of the dialogue into one or more segments;
- analyzing each of the one or more segments; and
- grouping the one or more segments into the one or more question-answer pairs.

9. The computer-implemented method of claim 6, further comprising:
- receiving feedback from the user, wherein the feedback indicates an understanding of the summary by the user; and
- updating the one or more summarization models with the feedback.

10. The computer-implemented method of claim 6, further comprising:
- identifying one or more questions from the electronic representation; and
- generating one or more respective answers for each of the one or more questions, wherein the one or more respective answers are selected based on being associated with any of the one or more questions.

11. A computer program product for summary generation of dialogue guided by pre-defined queries comprising a computer readable storage medium having program instructions embodied therewith, the program instructions executable by a processor to cause the processor to perform operations, the operations comprising:
- transcribing an electronic representation of a dialogue from an ongoing human-to-human conversation;
- identifying one or more question-answer pairs from the electronic representation;
- providing the one or more question-answer pairs and the dialogue simultaneously to one or more trained summarization models:
- generating, concurrently, based upon the provided question-answer pairs and the dialogue, wherein the summary is a combined extractive summary that comprises layman prose and abstractive summary that comprises the entire dialogue, and one or more answers from the dialogue using the one or more trained summarization models when there are one or more questions without a corresponding answer in the dialogue, wherein the one or more trained summarization models ingest the question-answer pairs and the electronic representation as a whole, and wherein generating the summary includes:
- extracting completeness data, wherein the completeness data comprises important sentences, such as key phrases and/or utterances as-is from dialogue, from the extractive summary, and
- extracting coherency data, wherein the coherency data comprises a natural language summary given the dialogue, from the abstractive summary; and
- displaying the summary of the dialogue to a user.

12. The computer program product of claim 11, wherein transcribing the electronic representation of the dialogue includes:
- classifying one or more segments of the electronic representation of the dialogue with respective labels, wherein the respective labels indicate at least one segment of the electronic representation of the dialogue as an answer.

13. The computer program product of claim 11, wherein identifying the one or more question-answer pairs from the electronic representation includes:
- parsing the electronic representation of the dialogue into one or more segments;
- analyzing each of the one or more segments; and
- grouping the one or more segments into the one or more question-answer pairs.

14. The computer program product of claim 11, wherein the processor is further configured to perform operations comprising:
  receiving feedback from the user, wherein the feedback indicates an understanding of the summary by the user; and
  updating the one or more summarization models with the feedback.

* * * * *